Figure 1:
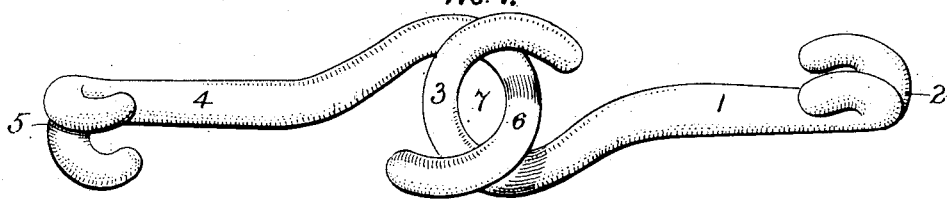

(No Model.) 2 Sheets—Sheet 1.

H. D. WINTON.
INSULATOR.

No. 445,790. Patented Feb. 3, 1891.

WITNESSES

INVENTOR (No Model.) 2 Sheets—Sheet 2.
H. D. WINTON.
INSULATOR.
No. 445,790. Patented Feb. 3, 1891.
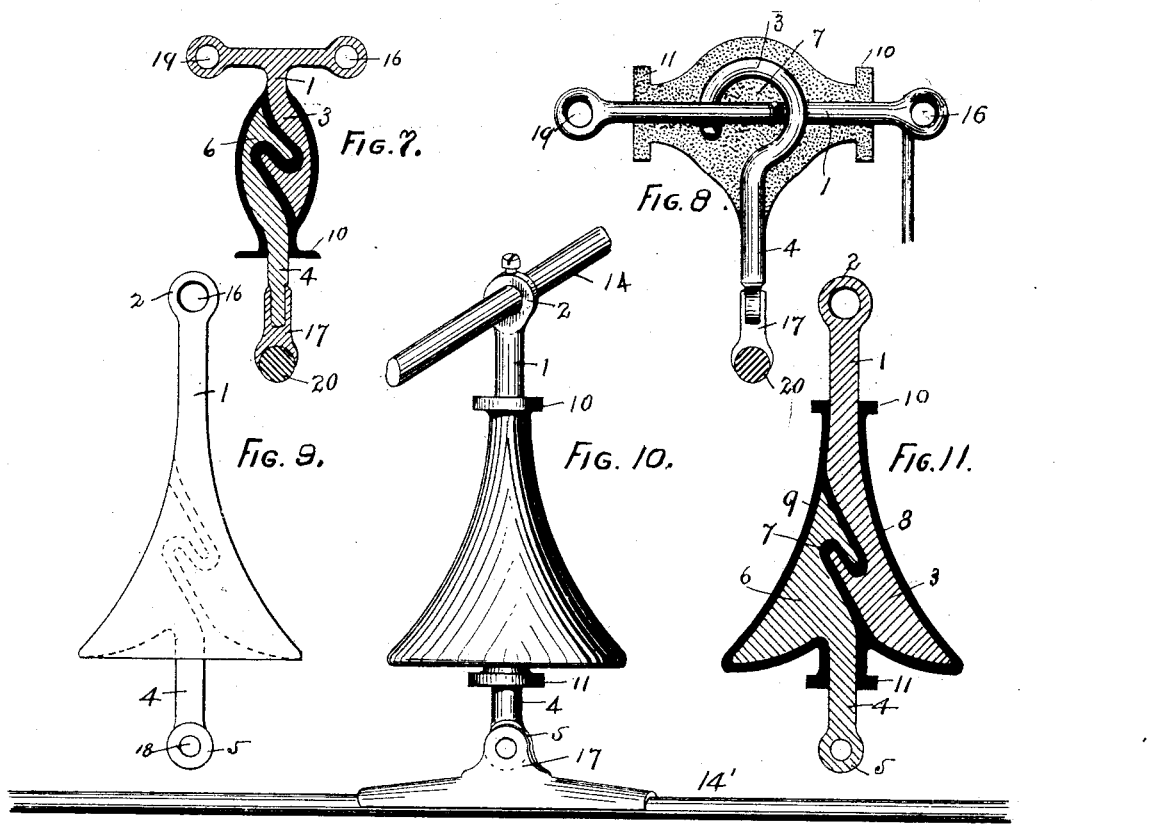

UNITED STATES PATENT OFFICE.

HENRY D. WINTON, OF WELLESLEY, MASSACHUSETTS.

INSULATOR.

SPECIFICATION forming part of Letters Patent No. 445,790, dated February 3, 1891.

Application filed July 23, 1890. Serial No. 359,659. (No model.)

*To all whom it may concern:*

Be it known that I, HENRY D. WINTON, of Wellesley, in the county of Norfolk and State of Massachusetts, a citizen of the United States, have invented a new and useful Improvement in Insulators for Overhead Telegraphic and Electric Lines, of which the following is a full, clear, and exact description, reference being had to the accompanying drawings, forming a part of this specification, in explaining its nature.

This invention relates to insulators for overhead telegraphic and electric lines, and is designed especially for looping into circuit electric lamps, telephone, and telegraphic and other electrical instruments, and for supporting, separating, and insulating apart electric lines of any description.

My invention as here described comprises an improvement in insulators which are shown and described in Letters Patent granted to me November 9, 1886, and numbered, respectively, 352,436 and 352,437.

It consists in a telegraphic insulator which is molded or otherwise formed into such shape that it will readily shed rain and moisture, and is so constructed that at each end a wire or other conductor can be securely attached to metallic hooks, cross-heads, or their equivalents, which are molded, cast, or otherwise secured within the insulating material in such a manner that they interlink in the material so as to give strength to withstand strain placed upon the hooks or cross-heads.

It further consists in so forming metallic hooks or "cross-heads," as I will term them, that they give form to the exterior of the insulator, so that, in lieu of molding the insulating material around the hooks or cross-heads in a mass, the insulating material can be formed in sheets of given thickness and laid or covered over the metallic portion of the hooks or cross-heads which are to be insulated, and then cured or hardened in this condition.

It further consists in so forming such metallic hooks that the portions which are inclosed in the insulating material are separated apart and at the same time interlinked with each other rather than upon the insulating material, so that they are dependent upon each other for strength to support the strain of the attaching-wires, and, further, so that, should the insulating material give way or crush, the hooks or cross-heads would not fall apart, but cling together and cause only the temporary interruption of the current from its intended course.

In the inventions above referred to I have described as a means for re-enforcing the insulator against breakage and for securing the conducting-wires from falling to the ground in case of its breakage, or in case the metallic cross-heads should by any chance be pulled out under extraordinary strain, the introduction of a metallic ring or other equivalent devices molded into the insulator or caused to encircle it; but it will be seen that in my present invention each hook or cross-head is re-enforced by the other, thereby eliminating or rendering unnecessary the use of separate rings or a third piece, thus forming a more practical and economical means of constructing the insulator. I have found also that in the use of hard rubber, or what is known as "vulcanite," it is more practical and economical to use it in a sheet form than in bulk, and in order to construct the insulators from rubber, which is in sheet form, it is necessary to make the form or contour of the insulator by means of the shape of the hooks which are molded within it; or, in other words, instead of giving the shape to the insulator by the forming of a mass of material in a mold, I form the hooks of any desired shape and separate them by means of a layer of the rubber, and then covering the exterior of the hooks with a layer of the rubber, the insulator when complete will have the general form or shape given to it by the metallic hooks embedded in it. A more expensive and higher grade of insulating material can be used in this construction than if it were given shape by bulk of material. In the cheaper composition of insulating material, which is pressed into shape by a mold, the cross-heads can be made in hook shape to clasp by each other and the material be pressed all around the hooks while they are held in a mold.

Figure 2:
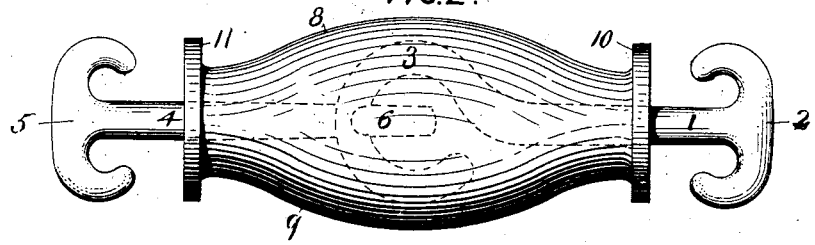
Figure 3:
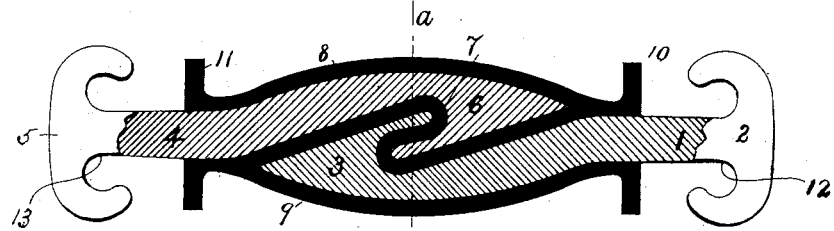
Figure 4:
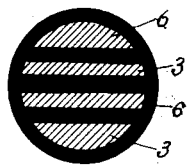
Figure 5:
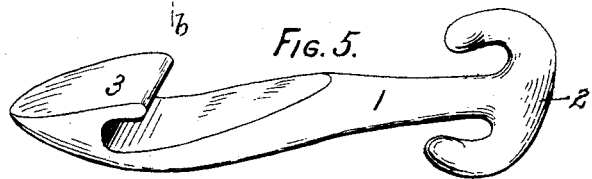
Figure 6:
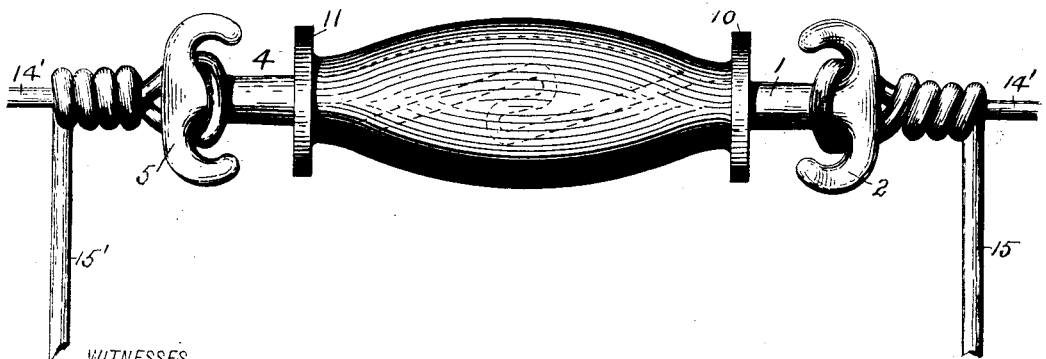

Referring now to the drawings, Figure 1 represents two hooks or cross-heads without insulating material applied to them. Fig. 2 represents a complete insulator, showing in dotted lines the position of the hooks when embedded in the insulating material. Fig. 3 represents a sectional view of a modified form in which the insulating material is formed upon the interlocked cross-heads in sheet. Fig. 4 is a sectional view of Fig. 3 on the line *a b*. Fig. 5 is a perspective view of one of the hooks or cross-heads used in the form of insulator shown in Fig. 3. Fig. 6 is an elevation of Fig. 3, showing the attachment of electric wires. Fig. 7 is a modified form for supporting wires and insulating them from their support. Fig. 8 represents a modified form for supporting wires, the insulating material being of the same nature as shown in Fig. 2. Figs. 9, 10, and 11 represent different views of the same construction of insulator intended for the support of trolley-wires in electric-railway service. Fig. 12 represents a modified construction of the insulator represented in Fig. 3.

Similar numbers refer to the same or similar parts in the several figures.

Referring to Fig. 1, 1 represents a metallic hook, one end having a cross-head, as at 2, of a form to admit of the ready attachment of wires. At the other end is formed a hook, as at 3.

4 represents a hook precisely like the one just described, having a similar cross-head 5 and hook 6. These hooks are cast, bent, or otherwise so shaped that they can be hooked by each other, as indicated at 7, the hooks being of sufficient diameter to leave a space between them, so that when they are held in a mold insulating material can be forced or run all around the hooks, so that they are entirely separated. When the insulating material has been formed around the hooks, it will appear as shown in Fig. 2, in which the dotted lines indicate the position of the hooks.

The outside exterior shape of the insulator, as at 8 and 9, is formed so that any rain or moisture gathering upon it will readily drip from the center. Lips or flanges, as at 10 and 11, prevent the moisture from making continuous contact between the two hooks.

Instead of the form of hook here shown, it is preferable, when hard rubber or composition of the same nature is used, to slightly modify the method of construction, both on account of the economy of material and method of handling, and for this reason I form the metallic hooks after the manner shown in Fig. 5, 1 representing the main body, 2 the cross-head, and 3 the interlinking hook. In preparing such a hook a pattern would be made by turning a piece precisely the shape of the exterior of the insulator, excepting the lips or flange part, providing it with cross-heads at each end. This piece would be split into two parts, so that there would be a space between them equal to the thickness of the insulating material to be used. The two pieces would be separated in such a manner that they would have the hook form indicated at the points 3 and 6. From one of these pieces metallic castings would be made, and in the construction of the insulator the rubber, which is in a thick tacky sheet form, would be cut in the desired shape to lay over the surface of one hook. The other would then be laid upon this. The exterior would then be covered with a layer of the sheet-rubber, and washers 10 and 11, as indicated at Fig. 3, would be placed upon the ends, and the whole be subjected to a vulcanizing process to complete it. When desired to secure a practically smooth or accurate surface, a mold can be placed over it, and a sufficient pressure be applied to keep it perfectly close and smooth while it is being vulcanized. In the insulators so constructed the hooks are thoroughly separated or insulated from each other, and have a sectional view as shown in Fig. 4, which is taken upon the line *a b*. The hooks are thoroughly protected from each other on the outside from moisture or rain by means of the lips or washers 10 and 11. It will be seen that in this form hard rubber, which is expensive, can be used economically and advantageously, and at the same time a very strong and durable insulator is obtained. No matter what strain is brought upon the hooks there is no tendency for the rubber to break or part; but on the contrary the tendency is to compress or crush the rubber between the two portions, as indicated at 7. This surface is so wide and the rubber so hard that the material will break at the points 12 and 13 before the insulator will give way at any other place. In testing the insulator for breaking it has been found that they part at this point before the insulating material separating the hooks is affected, so that it is only necessary to have that part of the metallic cross-head strong enough to stand all the strain of the wire it has to support.

Fig. 6 represents the same insulator in elevation, the dotted lines showing the internal form of the hooks, 14 and 14' representing the lines of an electric circuit attached to the insulator, and 15 and 15' a continuation of said lines, which are extended to include an instrument through which it is desired to conduct the current.

In the modification represented in Figs. 7 to 11, inclusive, the insulator is applied for supporting trolley-wires for the operation of electric-railway lines.

Fig. 7 represents the interior construction of a trolley-support made similar to that described by Fig. 3. In lieu of the cross-heads as they are described, I form one of them with two eyes, as 16 and 19, so that wires can be attached in each. By this construction of cross-head the insulator can be secured in a supporting-line stretched from one side of the street to the other. The opposite or coincident depending cross-head is arranged with a loosely-connected recessed piece 17, adapted to hold a trolley-wire 20, as shown. This piece will be better understood by referring to 17, Fig. 12, and it may be in a form adapted to solder or secure a trolley-wire to, such as is in general use for the purpose. It will be seen that this construction as applied for use in connection with the trolley-wire provides a very strong support, and at the same time the trolley-wire is perfectly insulated from its supporting-wire.

Further modification of the insulator is shown in Fig. 8, in which the material is molded upon the hooks or cross-heads in a mass instead of in sheet form, and is of the nature described and shown by Fig. 2. In this construction 1 represents the hook or one attaching end molded into the insulating material and provided at its extremities with eyes for securing it to the supporting-wire, similar to that just described in Fig. 7. 4 represents the other extended hook or attaching piece formed to hook over or by its fellow in the interior of the insulating material, as indicated at 7. By this construction it will be seen that complete protection is made against the breaking of the insulating material, so that the strength of the material is not alone depended upon to carry the strain of the wires.

Figs. 9, 10, and 11 represent a slightly-different form, by which it will be more fully understood how a trolley-wire support may be constructed embodying the principles hereinbefore described. This insulator would be formed in the following manner: A pattern is first turned into the general form indicated in Fig. 9, it being a good form to shed rain and moisture from one attaching portion to the other. This pattern is then separated into two sections, as indicated by the dotted lines. Castings are secured of these pieces, and the insulating material formed in sheet is then cut to the desired shape, so that a layer having its parts interfolded can be placed between the two sections, as indicated by 7 in Fig. 11. The two sections are then wrapped with a layer of the material, as at 8 and 9. Washers or lips, as at 10 and 11, are then placed at the extreme ends to form more effectual drips, and the whole is then cured or hardened by the vulcanizing process. The attaching piece, as indicated at 17, Fig. 10, is then secured to one section of the metallic casting, and is of suitable shape to admit of soldering the wire 14' to it. The supporting-wire 14 is then attached to the projection of the other section of the metallic casting in any desired manner, as indicated, by passing the wire through the eye and securing it with a set-screw. This form or construction of support provides a most efficient device in that it thoroughly insulates the trolley-wire from its support. At the same time it is of a form to thoroughly shed all rain or moisture from the attaching ends, and it is as strong as it is possible to make it and provide insulation between the two points. It is further economical in its construction on account of the very small amount of insulating material required, which is usually more expensive than the metal from which the attaching portions or cross-heads would be made. It will be readily seen that if a support of similar design was formed by the molding of a mass of material around two hooks embedded in the ends, which is a form somewhat used, it would require considerable of the insulating material, and in case of the breaking of the material the wires would be precipitated into the street. The novelty and value of this construction are obvious.

In the formation of the insulators I do not confine myself to any particular material, neither do I confine myself to any particular form or shape, so long as the hooks interlink or re-enforce each other in the insulating material and are provided with suitable sheds or drips to insulate the hooks or cross-heads effectually from each other; nor do I confine myself to the precise shape of the hooks, neither as to their exterior attaching ends or their interior hook shape or interlinking form. They might be formed so as to more thoroughly interlink each other, as indicated in Fig. 12, and at the same time various forms might be given to the exterior of the insulator, as shown in that figure.

Having thus fully described my invention, what I desire to secure by Letters Patent is—

1. The combination, with an electric line or conductor, of an insulator made of glass, porcelain, rubber, or other suitable material, having at its extremities metallic hooks, cross-heads, or other equivalent devices, the shanks of which interlock or interlace and are cast, embedded, or otherwise permanently inclosed within it without establishing a metallic contact, whereby the parts of the line may be dropped below it or carried above or around it, substantially as and for the purpose set forth.

2. The combination, with an electric line or conductor, of an insulator made of glass, porcelain, rubber, or other suitable material, having at its extremities metallic hooks, cross-heads, or equivalent attaching devices, the shanks of which interlock or interlace in said insulator without establishing a metallic contact, and projections for shedding rain or moisture from said attaching-hooks or cross-heads, whereby the electric lines or conductors attached to the insulator may be thoroughly insulated from each other and may be dropped below it or carried above or around it, substantially as and for the purpose described.

3. The combination, with the lines of an electric circuit or electric conductor-support, of an insulator made of glass, porcelain, rubber, or other suitable material, having metallic hooks, cross-heads, or equivalent attaching devices, the shanks of which interlock or interlace and are cast, embedded, or otherwise permanently secured within it without establishing a metallic contact, said hooks or cross-heads being thus re-enforced by each other and separated from each other, and lips or projections formed upon and around the face of the insulator suitable to shed rain or moisture from the attaching ends, whereby the lines or conductors secured thereto may be electrically separated from each other, substantially as and for the purpose set forth.

4. An electric insulator composed of metallic cross-heads or equivalent attaching-pieces, having shanks which interlock or interlace with each other in an insulating material which acts to separate the shanks in part to prevent metallic contact, and drips or projections formed upon the face of the insulator near the point of contact of the wires with the attaching ends, adapted to protect the wires from electric contact with each other by rain or moisture upon the surface, substantially as and for the purpose set forth.

5. An electric insulator composed of metallic cross-heads or equivalent attaching-pieces, having shanks shaped to interlock or interlace and which are interlocked, but separated from each other by a layer of insulated material, as and for the purpose described.

6. An electric insulator composed of metallic cross-heads or equivalent attaching-pieces provided with shanks shaped to interlock or interlace, and which do interlock or interlace, but are separated from each other by a layer of insulating material, and insulating material surrounding the outer surface of the interlocked or interlaced shanks, binding or uniting them together, as and for the purpose described.

7. An insulator for electric lines or conductors, composed of two hooks or cross-heads conformed to interlock with each other in an insulating material, having shanks which interlock or interlace with each other in an insulating material molded, cast, or otherwise applied around the interlocking ends of the said shanks, which insulating material is shaped to shed moisture from its surface and is provided with lips or projections adapted to drip or shed moisture from the ends of the attaching-hooks, substantially as and for the purpose set forth.

8. An insulator for electric lines or conductors, composed of two hooks or cross-heads having shanks conformed to interlock or interlace with each other and shaped to approximately form the exterior design of the insulator, and a layer of insulating material placed between the two shanks and extended about their exterior, combined substantially as and for the purpose set forth.

9. An insulator for electric lines or conductors, composed of two hooks or cross-heads the shanks of which are conformed or shaped to interlock or interlace with each other and shaped to approximately form the exterior design of the insulator, a layer of rubber or other insulating compound in sheet form placed between the interlocking portions of the shanks of the hooks or cross-heads, a layer of the same material over the exterior of the shanks or metallic hooks or cross-heads, and lips or projections formed of the same material and adapted to drip or otherwise shed rain or moisture from the projecting hooks or cross-heads, substantially as and for the purpose set forth.

10. An insulator for supporting trolley-wires for overhead electric railways, composed of two metallic sections interlinked with each other and separated from each other in an insulating material, and conformed to shed rain or moisture from the metallic sections, one of said sections being conformed for attachment to a supporting or cross wire, the other being formed to receive an attaching-piece adapted to receive and hold a trolley-wire, substantially as and for the purpose set forth.

HENRY D. WINTON.

In presence of—
F. F. RAYMOND, 2d,
CHAS. L. ELLIS.